(12) United States Patent
Guertler et al.

(10) Patent No.: US 12,469,676 B2
(45) Date of Patent: Nov. 11, 2025

(54) IN-SITU ETCH RATE OR DEPOSITION RATE MEASUREMENT SYSTEM

(71) Applicant: BÜHLER ALZENAU GMBH, Alzenau (DE)

(72) Inventors: Steffen Guertler, Böhlen (DE); Mario Berlinger, Leipzig (DE); Ralf Sperling, Leipzig (DE)

(73) Assignee: Bühler Alzenau GmbH, Alzenau (DE)

( * ) Notice: Subject to any disclaimer, the term of this patent is extended or adjusted under 35 U.S.C. 154(b) by 715 days.

(21) Appl. No.: 17/800,565

(22) PCT Filed: Feb. 3, 2021

(86) PCT No.: PCT/EP2021/052552
§ 371 (c)(1),
(2) Date: Aug. 18, 2022

(87) PCT Pub. No.: WO2021/165043
PCT Pub. Date: Aug. 26, 2021

(65) Prior Publication Data
US 2023/0139375 A1    May 4, 2023

(30) Foreign Application Priority Data
Feb. 20, 2020  (EP) .................... 20158398

(51) Int. Cl.
*H01J 37/304* (2006.01)
*G01B 11/06* (2006.01)

(52) U.S. Cl.
CPC ........ *H01J 37/304* (2013.01); *G01B 11/0675* (2013.01); *H01J 2237/30466* (2013.01)

(58) Field of Classification Search
CPC .......... H01J 37/304; H01J 2237/30466; G01B 11/0675
See application file for complete search history.

(56) References Cited

U.S. PATENT DOCUMENTS 5,947,053 A     9/1999  Burnham et al.
7,833,381 B2 * 11/2010  Johnson ............ G01B 11/0683
                                              156/345.24
(Continued)

FOREIGN PATENT DOCUMENTS

CN      1851881 A    10/2006
JP      S59150534 A   8/1984
KR      20100064395 A  6/2010

OTHER PUBLICATIONS

Japanese Official Action (Aug. 8, 2023) for corresponding Japanese App. 2022-549911.

(Continued)

*Primary Examiner* — Sean M Luck

(74) *Attorney, Agent, or Firm* — Muncy, Geissler, Olds & Lowe, P.C.

(57) ABSTRACT

A system is provided for in-situ ion beam etch rate or deposition rate measurement, including: a vacuum chamber; an ion beam source configured to direct an ion beam onto a first surface of a sample located within the vacuum chamber and to etch the first surface of the sample with an etch rate; or a material source configured to deposit material onto a first surface of a sample located within the vacuum chamber with a deposition rate; and an interferometric measurement device located at least partially within the vacuum chamber and configured to direct light onto a second surface of the sample and to determine the etch rate of the ion beam or the deposition rate of the deposited material in-situ based on light reflected from the sample.

15 Claims, 11 Drawing Sheets

(56) References Cited

U.S. PATENT DOCUMENTS

2005/0029228 A1* 2/2005 Nozawa ............. G01B 11/0675
                                                              216/60
2007/0100580 A1   5/2007 Marcus et al.
2009/0065478 A1   3/2009 Dockery et al.

OTHER PUBLICATIONS

Korean Official Action (Oct. 18, 2024) for corresponding Korean App. 10-2022-7031631.
S. Gurtler et al: 11 ISERM: in-situ etch rate measurement system . SPIE—International Society for Optical Engineering. Proceedings. vol. 10009. Jun. 30, 2016 (Jun. 30, 2016). p. 100090N. XP055715549. US, ISSN: 0277-786X, DOI: 10.1117/12.2236642 ISBN: 978-1-5106-3549-4.
International Search Report (Apr. 13, 2021) for corresponding International App. PCT/EP2021/052552.
European Search Report (Jul. 6, 2020) for corresponding European App. EP 20 15 8398.

* cited by examiner

IN-SITU ETCH RATE OR DEPOSITION RATE MEASUREMENT SYSTEM

BACKGROUND AND SUMMARY

The invention relates to an in-situ etch rate or deposition rate measurement system and a method thereof.

Ion beam etching is a common tool for polishing and shaping of samples of various materials, e.g. optical components or thin films. In particular, an ion beam is a type of charged particle beam consisting of ions. A variety of ion beam sources exists, where the most common ion beams are of singly-charged ions.

The ion beam is directed onto a sample's surface where the impact of the ions erodes the sample's surface, abrading away (etching) a certain amount of material. The amount of material that is etched away by the ion beam depends, for example, on the ion beam parameters, the material composition of the sample and the time of exposure. The etch rate is defined as the amount of material removed from the sample's surface over time.

The ion beam is typically focused onto the sample's surface and has a Gaussian profile with a peak (maximum of the Gaussian ion beam profile) and a full width at half maximum (FWHM). The etch profile of the sample's surface can thus also be characterized by a peak etch rate and a FWHM.

In prior art systems, in order to determine the etch rate of the ion beam for a specific sample, a sample probe (reference sample) is pre-characterized using an interferometric measurement device based on surface form interferometric measurements, e.g. using a Fizeau-interferometer. Subsequently the sample probe is inserted into a vacuum chamber. The sample probe is ideally of the same material as the actual sample to be exposed to the ion beam afterwards. The sample probe is exposed to the ion beam for a predetermined amount of time using predetermined beam parameters, so-called footprint etching. The sample probe is taken out of the vacuum chamber and the etched profile is subsequently measured ex-situ by the interferometric device based on surface interferometric measurements. Thus, the peak etch rate, the FWHM and the etched volume can be determined. Thereafter, the actual sample is inserted into the vacuum chamber and processed in accordance with the determined etching parameters of the ion beam.

However, the prior art systems require a time consuming process to determine the etch rate parameters of the ion beam as the sample probe has to be inserted into and taken out of the vacuum chamber in addition to performing the aforementioned interferometric measurements before and after ion beam etching.

In addition, the sample probes have a limited lifetime, because the fringes of the surface form interferometric measurements can only be resolved for a certain depth of the etching profiles. That is, after a certain amount of etching on the sample probe, the depth of the etched profile cannot be resolved anymore by the prior art interferometric measurement devices. Such sample probes have to be exchanged regularly or newly polished, which is cost intensive.

Moreover, in order to determine the full ion beam profile, prior art systems have to use sample probes that are three to four times the size of the ion beam diameter, which necessitates large reference objects for the interferometric measurements and restricts the metrology and is cost intensive at the same time.

Similar problems arise in conventional deposition methods, where the deposition rate is measured ex-situ, i.e. before inserting the sample into the vacuum chamber for material deposition and after extracting the sample from the vacuum chamber.

It is desirable to overcome the above mentioned deficiencies of the prior art systems.

According to one aspect of the present invention a system for in-situ ion beam etch rate or deposition rate measurement is provided, the system comprising: a vacuum chamber; an ion beam source configured to direct an ion beam onto a first surface of a sample located within the vacuum chamber and to etch the first surface of the sample with an etch rate; or a material source configured to deposit material onto a first surface of a sample located within the vacuum chamber with a deposition rate; and an interferometric measurement device located at least partially within the vacuum chamber and configured to direct light onto a second surface of the sample and to determine the etch rate of the ion beam or the deposition rate of the deposited material in-situ based on light reflected from the sample.

That is, the system may be used to either determine the ion beam etch rate or the deposition rate of a material deposition technique. The deposition technique may be any one of chemical vapor deposition, CVD, physical vapor deposition, PVD, low-pressure chemical vapor deposition, LPCVD, plasma-enhanced chemical vapor deposition, PECVD, or plasma-assisted CVD.

In the deposition rate determination, the material coming from a material source is deposited onto the sample's surface and the deposition rate may be determined as the thickness variation (increase) over time. In contrast, in the ion etch rate determination, the material is removed from the sample's surface and the etch rate may be determined as the thickness variation (decrease) over time.

As mentioned above, the interferometric measurement device may at least partially be located within the vacuum chamber, e.g. a sensor and an optical fiber may be located within the vacuum chamber, while other elements such as power supply, controller and other components of the interferometric measurement device may be located outside the vacuum chamber.

The interferometric measurement device may be configured to determine the etch rate while etching the first surface of the sample, preferably after a predetermined stabilization time, preferably more than 2 minutes, more preferably more than 3 minutes, even more preferably more than 4 minutes, and most preferably 4-5 minutes or longer. That is, the etch rate measurement may be performed at the same time as the etching is being performed.

The interferometric measurement device may be configured to determine the deposition rate while depositing the material onto the first surface of the sample. That is, the deposition rate measurement may be performed at the same time as the deposition is being performed.

The etch rate may be defined as the amount of material removed from the sample's first surface over time.

The deposition rate may be defined as the amount of material deposited onto the sample's first surface over time.

The interferometric measurement device may be a high precision optical low-coherence interferometer, HP-OLCI.

The HP-OLCI as analyzing unit may be an interlaced interferometer and may be based on optical coherence tomography, OCT, technology. It may comprise two internal and two external arms. One internal arm may be equipped with a voice coil, which provides through its throw the working field. The second internal arm may be movable to provide scan range (thickness preferably 0-135 mm).

One external arm may be constituted by the sensor itself within the vacuum chamber of the ion beam figuring, IBF. The second arm may be an adjustable reference. This reference may be formed by an air gap. Both external arms may provide a signal; thickness is measured by the determination of the distance between both signals. For example, a DFB laser with 1550 nm may serve as scale.

The reference arm may be used to set an air gap with the optical thickness of the sample. The air gap may be generated from a glass plate (e.g. fused silica), which is movable (e.g. 135 mm) and a mirror. The HP-OLCI may consider only the interference burst of the interface and may compare it with the interference burst of the interface of the air gap (transition from fused silica to air). If both signals lie on top of each other, the thickness difference is zero. If the surface of the sample is etched off by the ion beam, the interference burst moves away from the reference burst. The distance between the two is determined with high precision by the maxima of the two bursts and the DFB laser interference signal (scale). The change over time may be output in nm/s and can be measured more precisely than 0.1 nm/s.

In other words, HP-OLCI is a highly accurate comparative thickness measurement device. The reference signal is normally generated by a sample whose thickness is known exactly and the difference to this reference sample is to be determined. The absolute thickness is not important for the present invention. Rather, the change over time is determined. Thus, an air gap may be used, which has the advantage of being variable.

The second surface of the sample may be opposite the first surface of the sample. That is, one side of the sample may be etched using the ion beam and the opposite side may be used to measure the etch rate. Similarly, material may be deposited onto one side of the sample and the opposite side may be used to measure the deposition rate.

The interferometric measurement device may be configured to determine the thickness of the sample over time and to determine the etch rate or the deposition rate based on the thickness variation of the sample over time.

The interferometric measurement device may comprises a sensor configured to direct the light onto the second surface of the sample and to collect light reflected back from the sample.

The sensor may comprise optical components to direct the light onto the second surface of the sample and to collect light reflected back from the sample.

The sensor may be located within the vacuum chamber.

The sensor may comprise the sample. That is, according to a preferred embodiment, the sample may be located inside the sensor.

The sensor may comprise a housing and the sample may be located inside the housing, preferably with the optical components also located inside the housing.

The housing may comprise an opening and the sample may be located at the opening such that the ion beam or the material to be deposited can reach the sample's first surface through the opening. In other words, the sample's first surface may be located at the opening of the housing.

The housing may comprise a graphite outer surface. Thus, leaving only the sample in exposition to the ion beam or the material to be deposited.

The interferometric measurement device may comprise a cooling device, e.g. a copper cooling device, in contact with the sample and may be configured to cool the sample.

The interferometric measurement device may comprise a positioning device configured to position the light at at least one predetermined location onto the second surface of the sample. The positioning device may be a x,y,z-stage on which the optical components may be mounted so that the optical components may be moved in three dimensions. In some embodiments also a two-dimensional x,y-stage may be sufficient to move the optical components in two-dimensions, preferably in parallel to the sample's second surface.

The controller may be configured to control the positioning device to position the light at the second surface of the sample at a location corresponding to the center of the ion beam to determine a peak etch rate of the ion beam.

The peak etch rate may be defined as the etch rate at the maximum intensity of the ion beam, wherein the ion beam has a substantially Gaussian form.

The controller may further be configured to control the positioning device to position the light at the second surface of the sample at a plurality of locations corresponding to locations within the ion beam profile to determine an etch rate of the ion beam profile.

For example, by obtaining several measurements at different locations corresponding to locations within the ion beam profile, a Gaussian fit can be used to determine the volume etch rate of the ion beam profile.

The controller may further be configured to control the positioning device to position the light at the second surface of the sample at a plurality of locations to determine a deposition rate at the plurality of locations.

The system may further comprise an alignment device configured to align the ion beam with respect to the first surface of the sample.

The alignment device may comprise a Faraday cup and a position camera or a characterization device configured to characterize the ion beam by a point-scan and to calculate the offset to an initial start point.

According to a further aspect of the invention a method for in-situ ion beam etch rate or deposition rate measurement is provided. The method comprises: directing an ion beam onto a first surface of a sample located within a vacuum chamber to etch the first surface of the sample with an etch rate; or depositing material onto a first surface of a sample located within the vacuum chamber with a deposition rate; directing light of an interferometric measurement device located at least partially within the vacuum chamber onto a second surface of the sample; and determining the etch rate of the ion beam or the deposition rate in-situ based on light reflected from the sample.

Normally, the sample (also called sample probe) as described herein may relate to the actual sample on which the ion beam processing or the deposition is finally to be executed or to a test sample to determine the ion beam etch rate or the deposition rate. This test sample should ideally be of the same material as the actual sample on which the ion beam processing or the deposition is finally to be executed.

In particular, if the sample is thin enough, the present invention may be used to measure the sample while etching the sample or during material deposition onto the sample without the need for using a test sample. For example, this "live" measurement on the actual sample while etching or depositing may be used to determine the etch rate or deposition rate by determining the center thickness of an optical lense. If the temperatures are expected to be high, a thin sample, e.g. having an optical thickness of up to 135 mm, may be advantageous since heat dissipation in thin samples is easier compared to thick samples. In other words, heat on the sample may be removed more effectively from thin samples due to the fact that optical materials may tend to be bad heat conductors.

However, in case of a constant temperature inside the sample, there is no restriction in the thickness of the sample. In any case, it is preferable to have a constant temperature inside the sample.

As apparent from the above description of the present invention, the present invention provides a system and method that reduces processing time in that the interferometric measurements of the sample can be executed in-situ. Thus, time consuming insertion and extraction of the sample into and out of the vacuum chamber can be avoided. In addition, the sample does not have to be measured before and after ion beam etching or material deposition, which saves additional time.

In addition, by the present invention, the sample can be used (reused) more often without the necessity to exchanged or newly polish the sample due to use of a thickness based interferometric measurement and thus costs may be saved.

Moreover, the present invention does not require the sample to be three to four times the size of the ion beam diameter for determining the etching profile of the ion beam due to use of a thickness based interferometric measurement, which again saves costs.

Further, the present invention allows for etch rate measurements under a non-orthogonal impact angle. This is particularly advantageous for highly curved samples, where the respective positioning system may not be able to allow for perfect orthogonal impact angles over the whole extend of the sample.

More particular, the etch rate is highly influenced by the impact angle and is different between different materials. The possibility for etch rate determination for such non-orthogonal impact angles is one of the advantageous of the present invention.

These and other features, advantages and aspects of the present invention will become apparent from the following description of the figures outlining exemplary embodiments of the present invention. The following description of exemplary embodiments of the present invention is not to be construed limiting for the scope of the present invention. Rather, the exemplary embodiments are intended to provide some non-exhaustive examples of how to implement the present invention. It will be apparent to the skilled person that the present invention is not limited by the combination of features of the following exemplary embodiments. Rather, features of different exemplary embodiments may be combined with features of other exemplary embodiments if not explicitly stated otherwise. That is, the scope of the present invention is solely defined by the features of the independent claims.

BRIEF DESCRIPTION OF THE DRAWINGS

Some preferred embodiments are now described with reference to the drawings, where.

DETAILED DESCRIPTION

Figure 1:
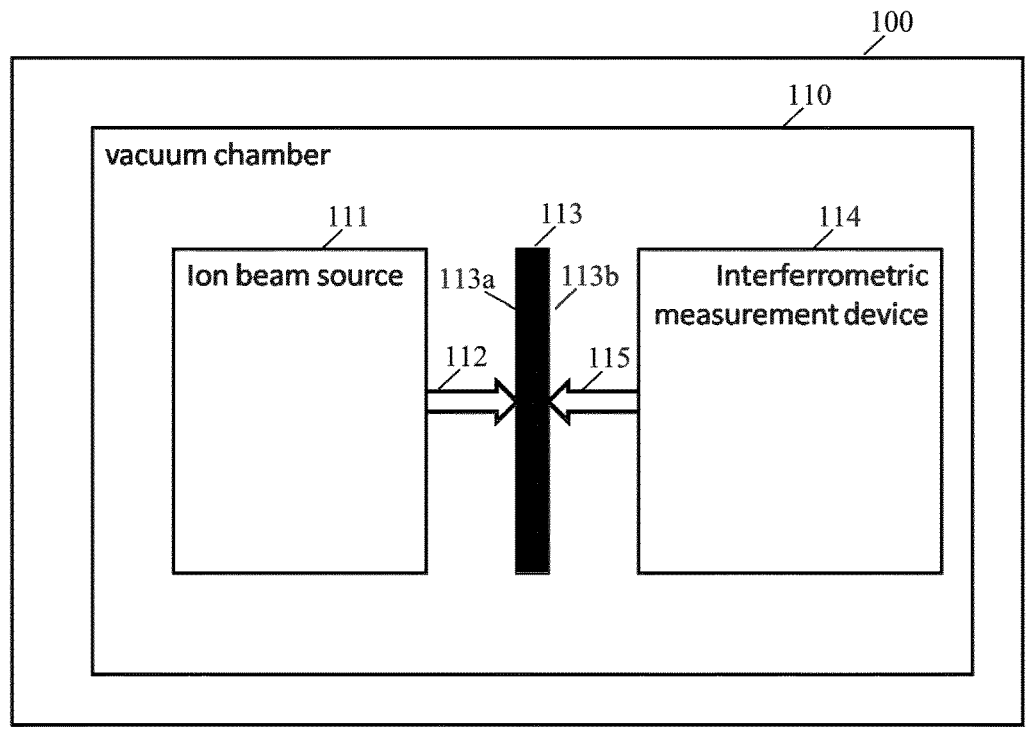
FIG. 1 illustrates one preferred embodiment of the system of the present invention.

With reference to FIG. 1 one preferred embodiment of the system of the present invention is described. FIG. 1 shows a system 100 for in-situ ion beam etch rate measurement. The system comprises a vacuum chamber 110, an ion beam source 111 and an interferometric measurement device 114.

The ion beam source 111 is configured to direct an ion beam 112 onto a first surface 113a of a sample 113 located within the vacuum chamber 110 and to etch the first surface 113a of the sample 113 with a certain etch rate.

The interferometric measurement device 114 is located at least partially within the vacuum chamber 110 and configured to direct light 115 onto a second surface 113b of the sample 113 and to determine the etch rate of the ion beam 112 in-situ based on light reflected from the sample 113.

The interferometric measurement device 114 may be a low coherence interferometer, e.g. build up of two entangled Michelson-interferometers having a modulator arm with a scanning range of approximately 400 micrometer, a measurement range arm (adjustable range between 0-135 mm thickness), the actual measurement arm, which is adjusted on the reference sample and an adjustable reference arm, which provides the reference signal for the thickness measurement. The light sources may be a combination of super luminescence diodes with a center wavelength of 1280 nm and 1310 nm. As a measure, a distributed feedback, DFB, laser with a wavelength of 1550 nm is coupled in for the interferometric measurement of the paths. This is just one example of an interferometric measurement device that can be used with the present invention. However, the present invention is not limited thereto. Any interferometric measurement device 114 which is able to determine the thickness of the sample 113 can be used together with the present invention. The aforementioned set-up of the interferometric measurement device 114 may, however, be advantageous over other such interferometric measurement device in terms of precision.

Figure 2:
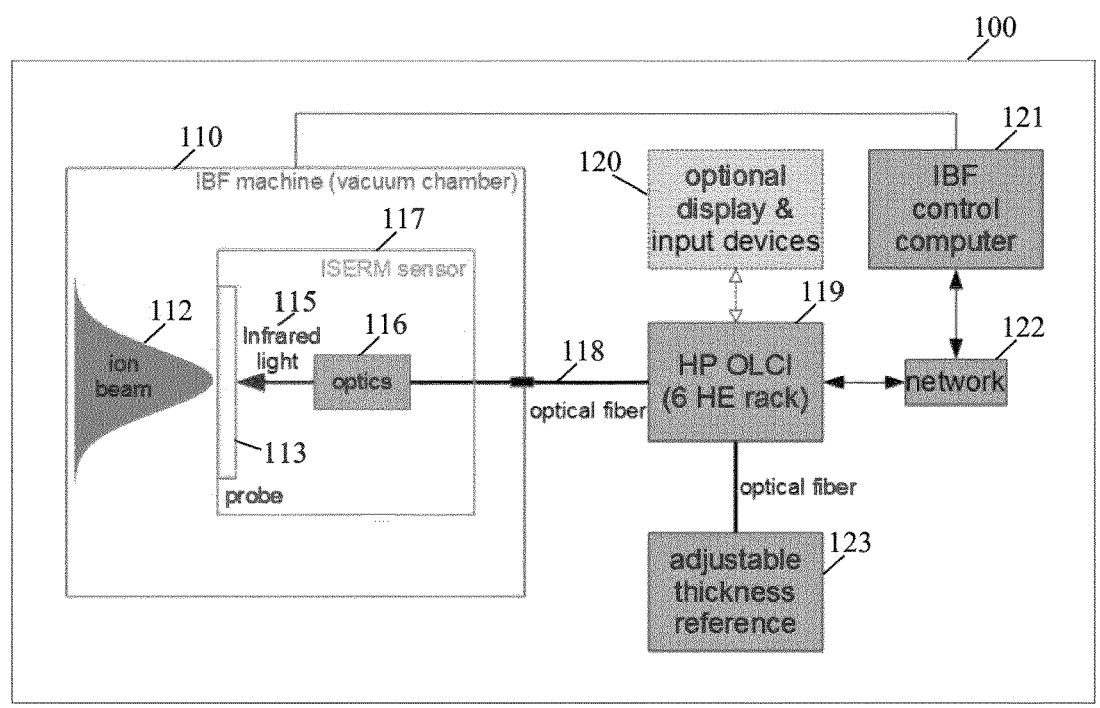
FIG. 2 illustrates another embodiment of the system of the present invention.

FIG. 2 illustrates another embodiment of the system 100 of the present invention. In particular, FIG. 2 illustrates the features already described with reference to FIG. 1 and further optional features of the system 100.

In particular, FIG. 2 shows the vacuum chamber 110, the ion beam 112, the sample 113, the light 115, optical components 116, a sensor 117, an optical fiber 118, a high precision optical low-coherence interferometer, HP-OLCI, rack 119, a display and input device 120, an ion beam figuring, IBF, control computer 121, a network device 122, and an adjustable thickness reference module 123.

The ion beam 112, the sample 113, the light 115, the optical components 116, the sensor 117, and partly the optical fiber 118 are located within the vacuum chamber 110. The sample 113 and the optical components 116 are located within the sensor 117.

The ion beam 112 is directed onto the sample's first surface 113a, e.g. through an opening (not shown) in the sensor's housing. The light 115, e.g. infrared light, is directed (focused) onto the opposite surface (second surface 113*b*) of the sample 113 by the optical components 116, wherein the light is provided to the optical components 116 through an optical fiber 118.

The sample 113 is located on an inner surface of the sensor 117, i.e. the sensor housing. The opening (not shown) in the sensor's housing is provided such that the sample's first surface 113*a* is partially exposed to the ion beam 112.

The optical components 116 are configured to focus the light 115 onto the sample's second surface 113*b* and to collect light reflected from the sample's surfaces 113*a*, 113*b*. The light reflected back from the sample's surfaces 113*a*, 113*b* gives rise to a unique interference pattern. By comparing this interference pattern with an interference pattern from a comparison sample in the adjustable thickness reference module 123, the thickness of the sample 113 can be determined.

For example, the interference patterns may comprise interference bursts, where the envelope of the interference bursts may be used to determine the thickness of the sample 113. In order to increase the accuracy of the thickness determination, the distance between the interference bursts may be used to determine the thickness of the sample 113.

It is even more preferable to evaluate the entire burst itself to further increase the accuracy.

The HP-OLCI rack 119 is connected to the optical components 116 via an optical fiber 118 and with the adjustable thickness reference module 123 via another optical fiber. The HP-OLCI rack 119 comprises the power supply, the light source(s) and respective control means for the HP-OLCI. The control means may be used to control the functionality of the interferometric measurement device 114 and may comprise a processing device, e.g. a processor, which may be configured to determine the thickness of the sample 113 based on the interferometric measurements and subsequently to determine the etch rate, i.e. the thickness variation over time.

The system 100 may also provide a display and input device 120 for displaying the results of said determination of the etch rate and to receive user input for controlling the different functions of the interferometric measurement device, e.g. the amplification and intensity of the light 115 onto the sample's second surface 113*b* and/or perform adjustments on the adjustable thickness reference module 123.

Controlling the amplification and intensity of the light 115 is advantageous because the light reflected from the sample's surface and therefore the intensity depends on the material of the sample. In addition, the intensity can decrease with increasing lifetime of the sample. Thus, to provide for sufficient intensity of the reflected light, the amplification and intensity of the light 115 directed to the sample's second surface 133*b* can be regulated.

The ion beam 112, i.e. the parameters of the ion beam 112 and the location of the ion beam 112 with respect to the sample, is controlled using the IBF control computer 121. Although not shown in detail in FIG. 2, the IBF machine provides the ion beam 112 and comprises the vacuum chamber 110.

Both the IBF control computer 121 and the HP-OLCI rack 119 are connected to a network 122 to provide centralized control over the ion beam 112 and the interferometric measurement device 114.

Figure 3:
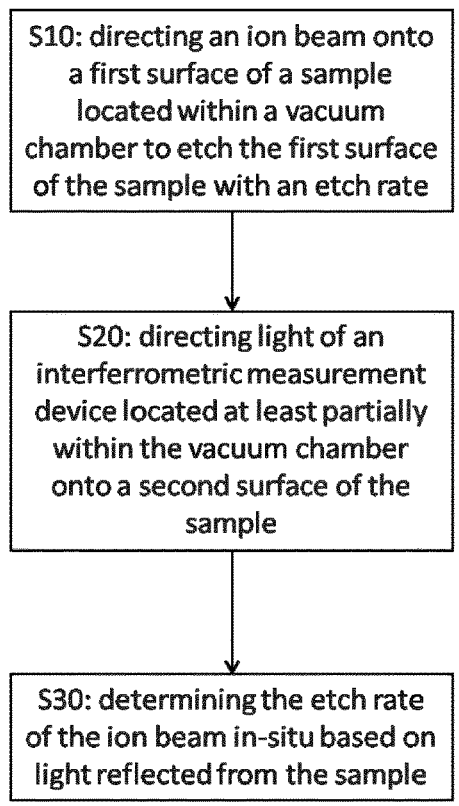
FIG. 3 illustrates a flow chart of a preferred embodiment of the method of the present invention.

FIG. 3 illustrates a flow chart of a preferred embodiment of the method of the present invention. In particular, FIG. 3 shows a first step S10 of directing an ion beam 112 onto a first surface 113*a* of a sample 113 located within a vacuum chamber 110 to etch the first surface 133*a* of the sample 113 with an etch rate.

At a second step S20 light 115 of an interferometric measurement device 114 located at least partially within the vacuum chamber 110 is directed onto a second surface 113*b* of the sample 113.

At step S30 the etch rate of the ion beam 112 is determined in-situ based on light reflected from the sample 113.

Figure 4:
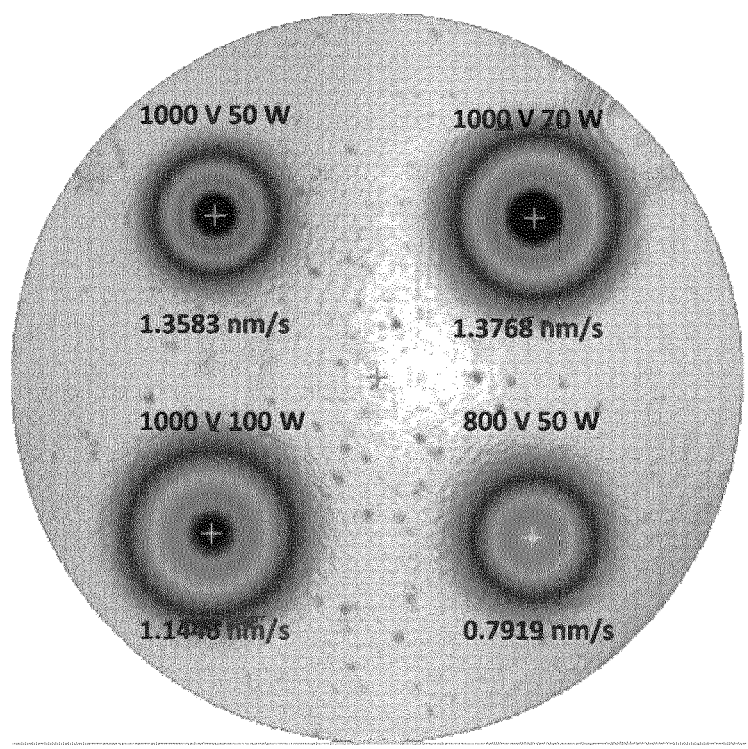
FIG. 4 illustrates a sample probe with differently etched footprints using different ion beam parameters.

FIG. 4 illustrates a sample probe with differently etched footprints using different ion beam parameters. In particular, the sample probe's surface is characterized, i.e. interferometric surface measurements are performed on the sample probe, before inserting the sample into the vacuum chamber. Subsequently, the footprints are etched into the sample probe's surface using the ion beam. The ion beam parameters are varied as follows: a) 1000 V and 50 W (upper left footprint in FIG. 4), b) 1000 V and 70 W (upper right footprint in FIG. 4), c) 1000 V and 100 W (lower left footprint in FIG. 4), and d) 800 V and 50 W (lower right footprint in FIG. 4). In a further step the sample probe is taken out of the vacuum chamber and the interferometric surface measurements are performed again to determine the etch rate of the different footprints. This corresponds to a prior art procedure.

Figure 5:
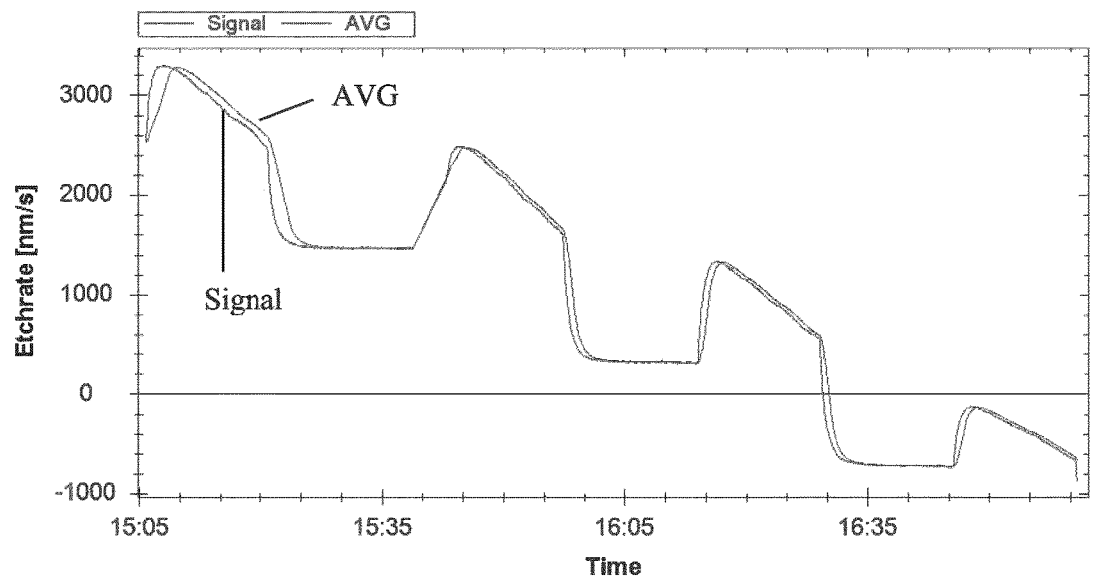
FIG. 5 illustrates in-situ raw etch rate measurements on a sample using different ion beam parameters.

For comparison, a sample of the same material, in this case fused silica, is measured using the present invention, i.e. in-situ, while the same beam parameters are used. The raw values obtained by the in-situ measurement, i.e. the thickness over time, is illustrated in FIG. 5 (together with the rolling mean values). Each measurement was performed for 20 minutes and a new measurement was started after 5 minutes after the previous measurement.

As can be seen from FIG. 5, the thickness initially, i.e. in the first 4-5 minutes, increases, which is due to effects of thermal expansion and change of optical index with increasing temperature. By using active cooling of the sample, it is possible to achieve stable conditions after 4-5 minutes, depending on neutralizer and beam power.

The beam geometry can be gained by running a point scan, i.e. measurements at different locations on the sample's surface. An initial heat up time (4-5 minutes) is needed for the first measuring-point, all other points only need 1-2 minutes heat up time to stabilize the measurement. The measurement points are preferably scanned in a spiral manner beginning in the center and advancing more outward. Thus, energy input can be kept almost constant and the required time for each measuring point can be reduced.

TABLE 1

| | Peak etchrate in nm/s | | | |
|---|---|---|---|---|
| Sample | ISERM | Interferometric method | Factor | Error in nm/s |
| 1 | 1.061378412 | 1.1578 | 0.916719996 | 0.09642159 |
| 2 | 1.271374238 | 1.2821 | 0.991634224 | 0.01072576 |
| 3 | 1.324530057 | 1.3943 | 0.949960594 | 0.06976994 |
| 4 | 1.121599131 | 1.129 | 0.993444758 | 0.00740087 |
| 5 | 1.079770321 | 1.0722 | 1.00706055 | 0.00757032 |
| 6 | 1.187326918 | 1.1944 | 0.99407813 | 0.00707308 |
| 7 | 1.189589273 | 1.1962 | 0.994473561 | 0.00661073 |
| 8 | 1.178635264 | 1.2135 | 0.971269274 | 0.03486474 |
| 9 | 1.162560841 | 1.1449 | 1.015425662 | 0.01766084 |

Table 1 shows nine comparison measurements between a conventional interferometric measurement on a 3 inch probe fused silica and a 1 inch 1 mm sample of the measurement device according to the present invention (in-situ etch rate measurement—ISERM). Depending on the manufacturing process of the material, the etch rate may vary significantly. Therefore, the reference sample of the measurement device should be made of the same material as the sample to be processed. Otherwise, a correction factor may be determined beforehand to account for the respective variation.

Figure 6:
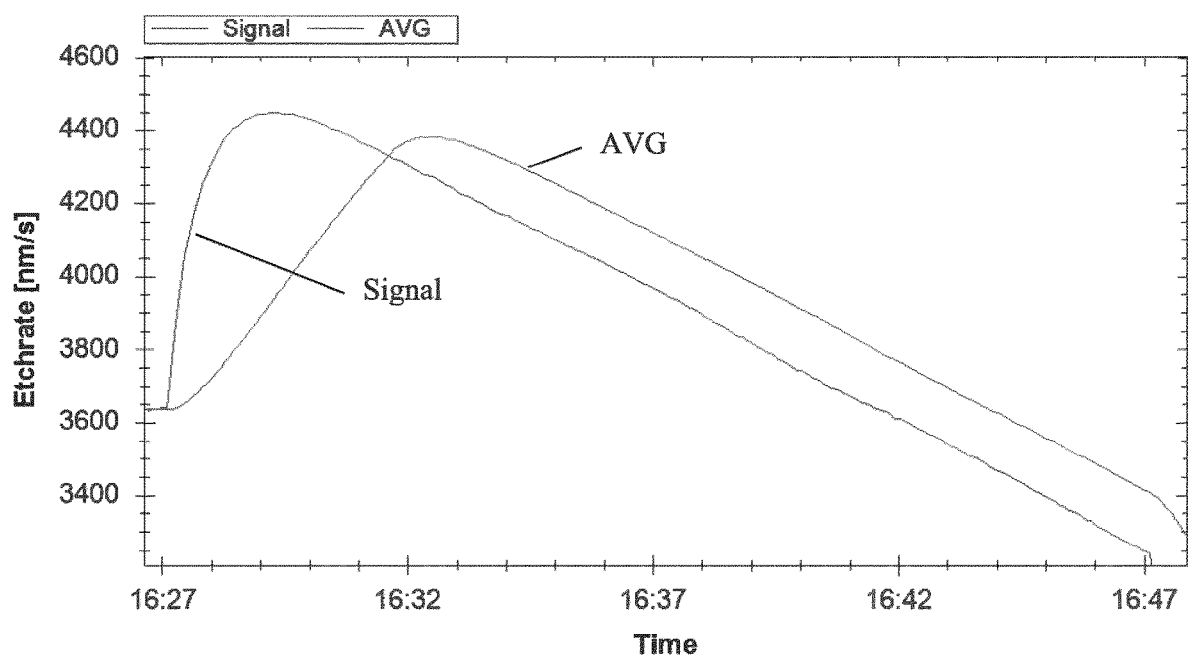
FIG. 6 illustrates in-situ raw etch rate measurements on a sample.

FIG. 6 is a beam scan graph showing the signal as well as the average values of the etch rate over time using the present invention. After an initial heat up of the sample, the etch rate decreases continuously.

Figure 7A:
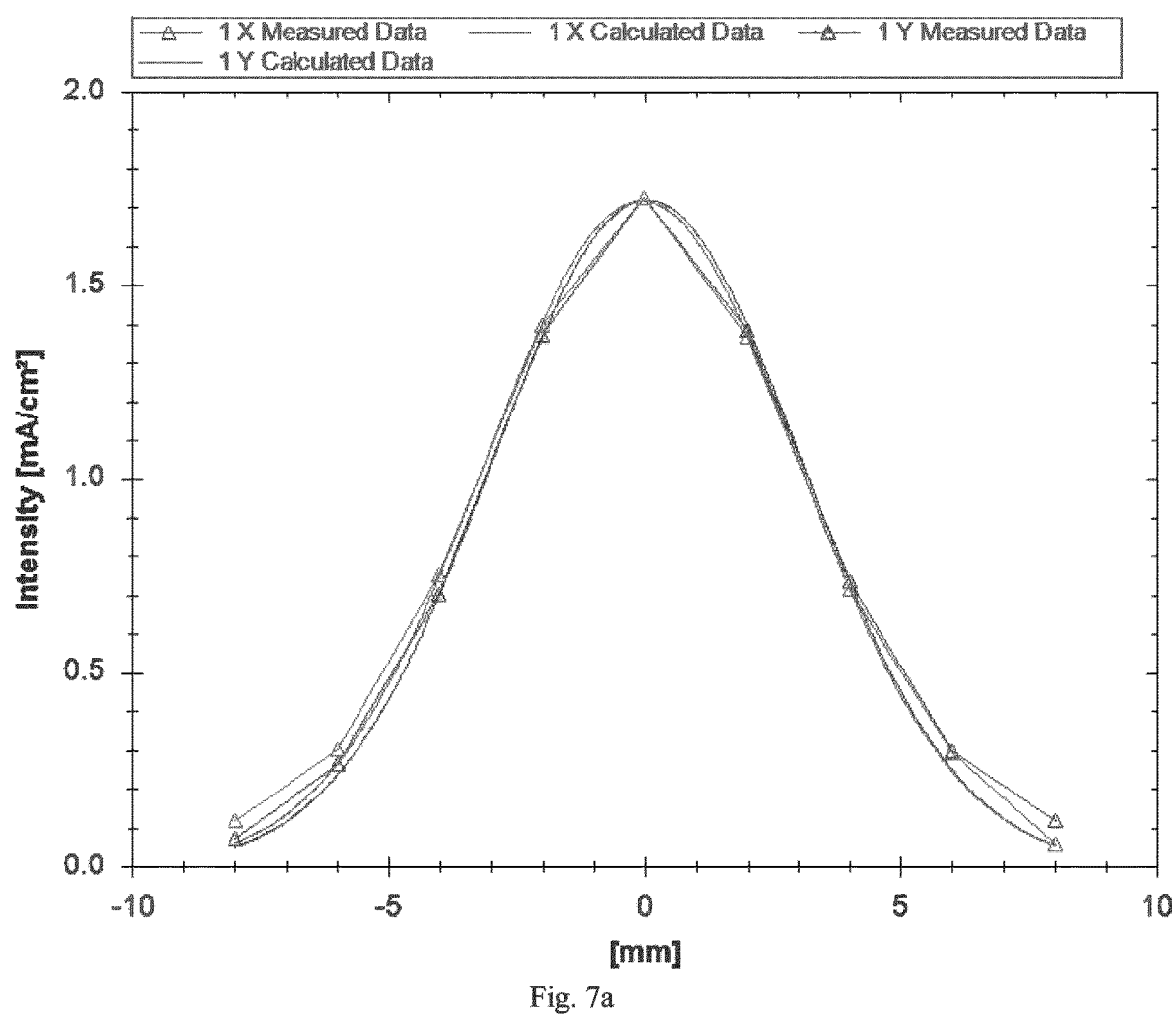
FIG. 7(a)-(e) illustrates a 48 hour measurement of the source stability measured each hour.
Figure 7B:
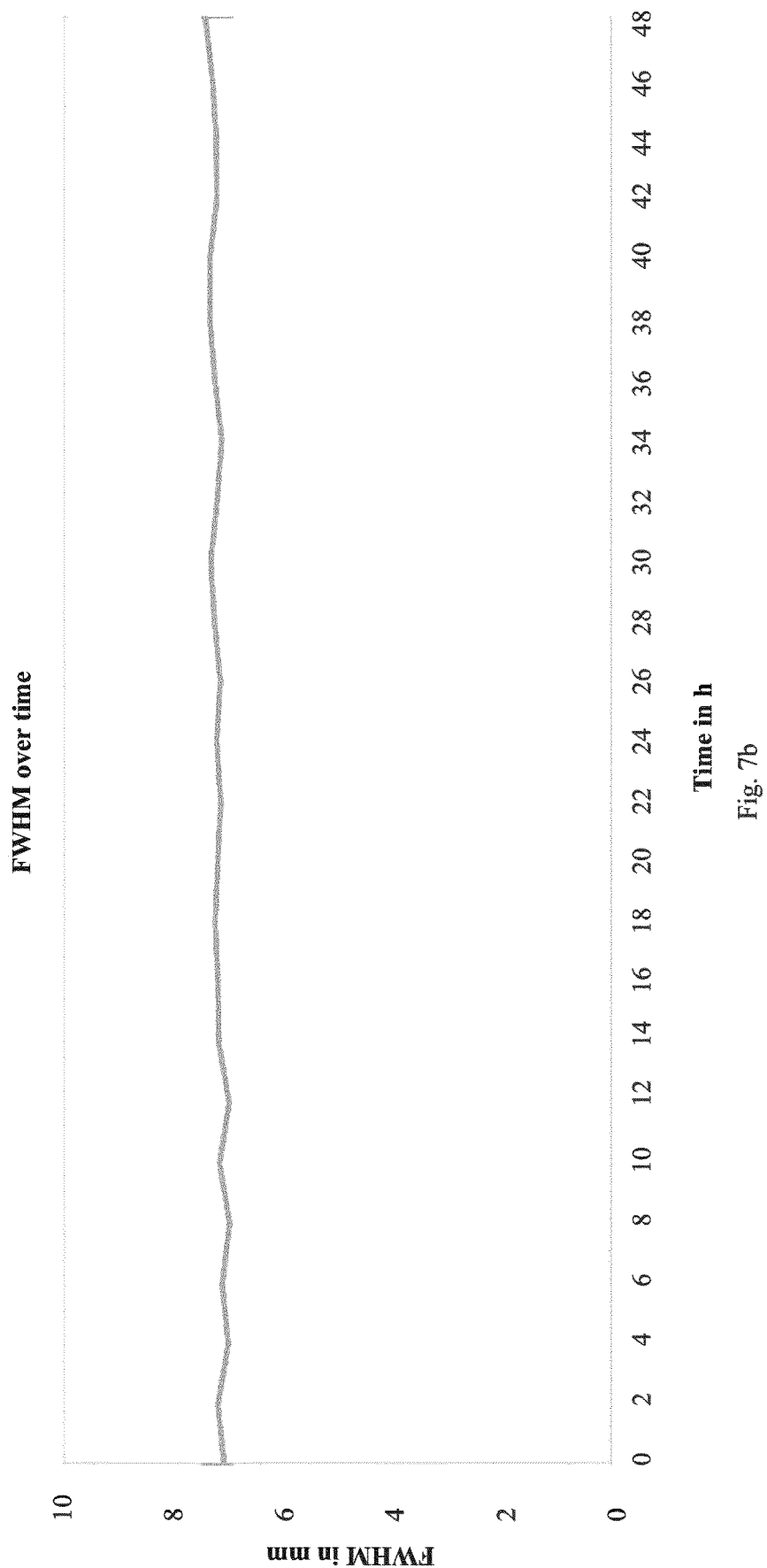
Figure 7C:
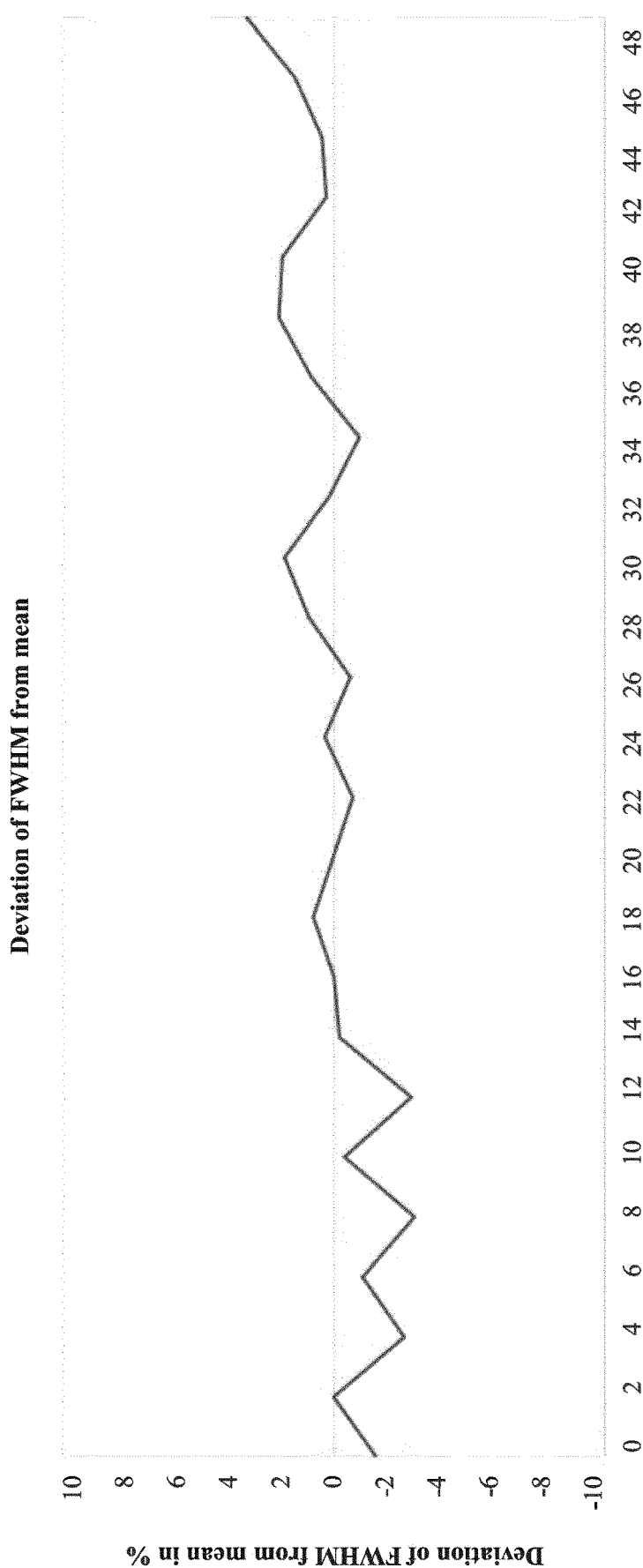
Figure 7D:
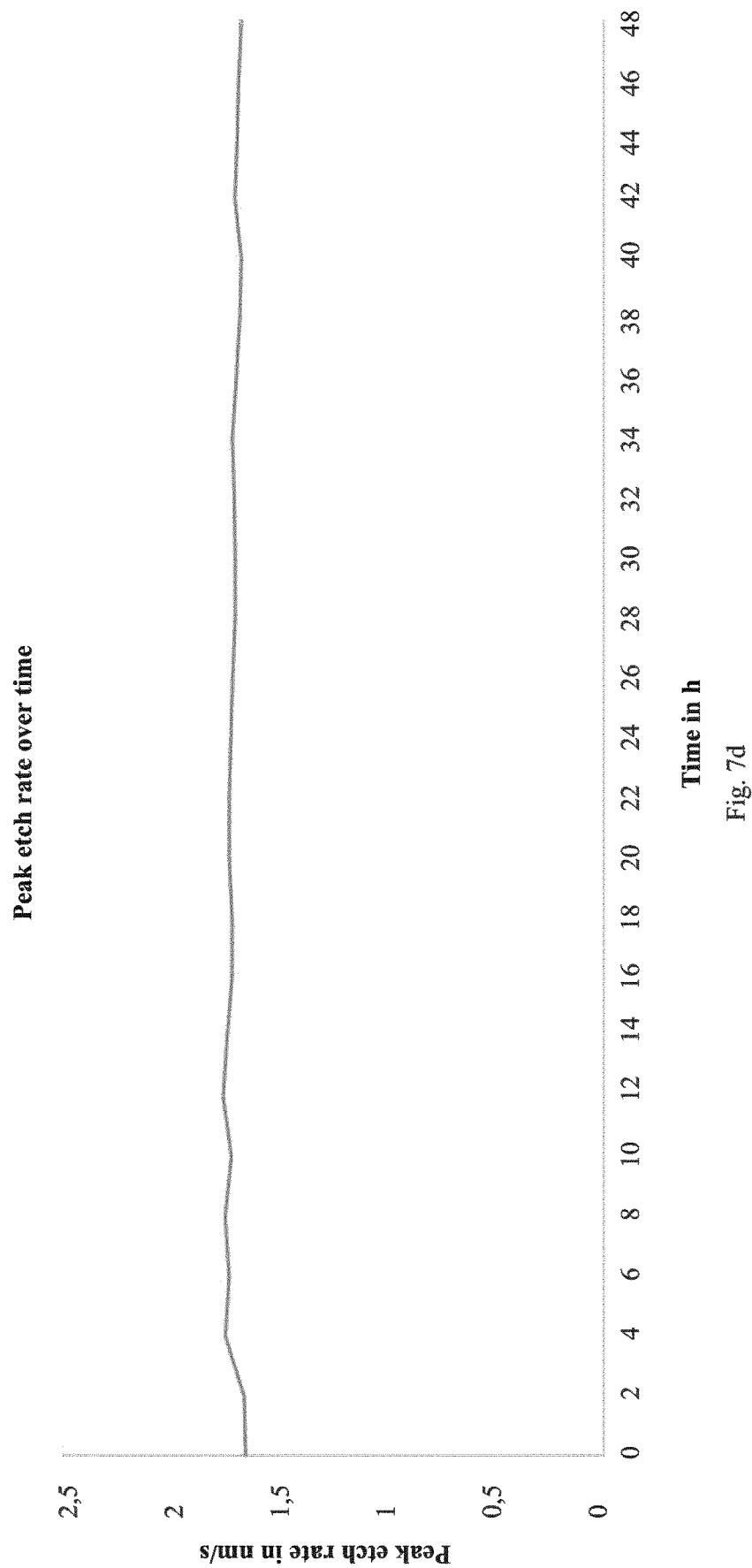
Figure 7E:
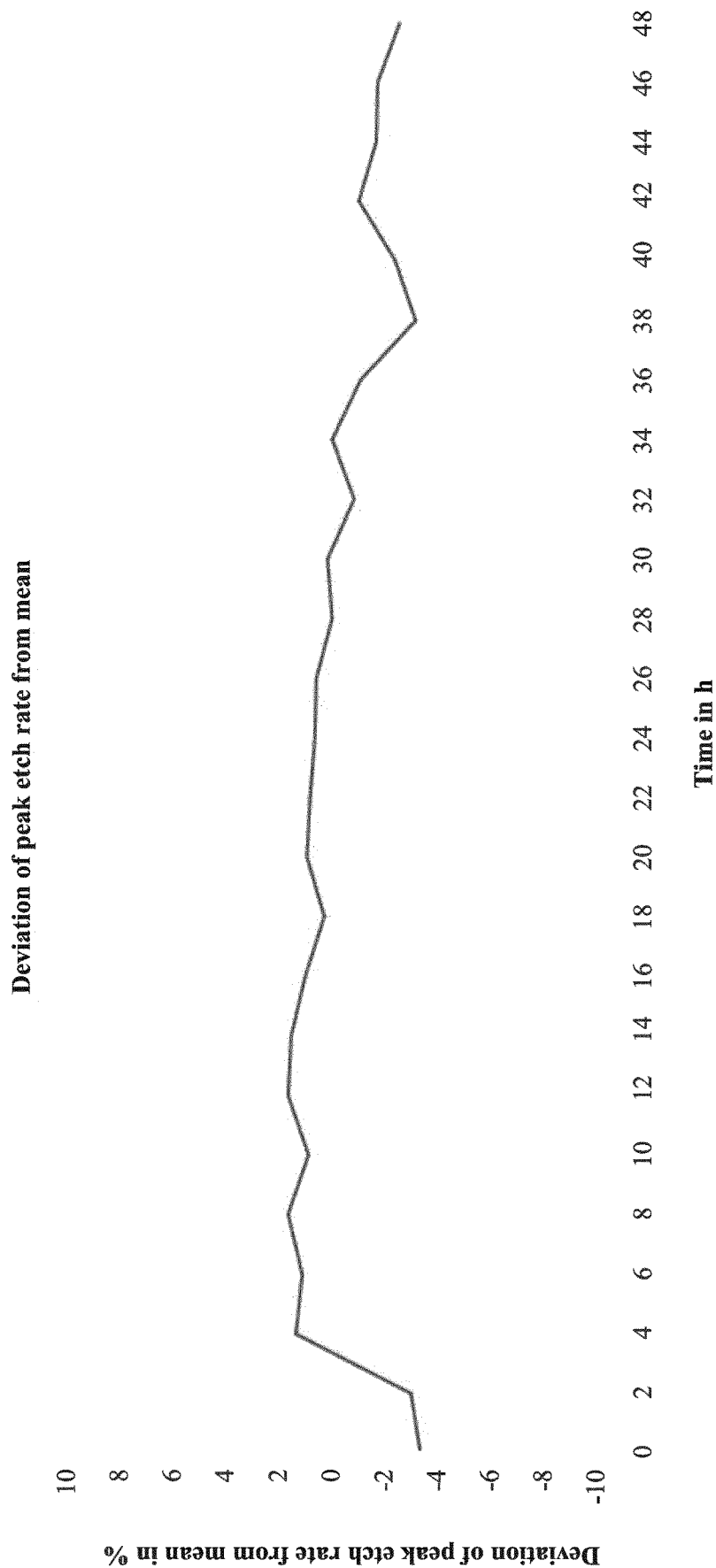

FIG. 7(a)-(e) depict a 48 hour measurement of the source stability. In particular, measurement values were taken every hour to obtain a stability of the peak etch rate (see FIG. 7(d)), full width half max (FWHM) over time (FIG. 7(b)) and the respective deviations thereof (FIGS. 7(c) and 7(e)). FIG. 7(a) shows one example measurement of the 48 hour measurement. As can be seen from the figures, a stable peak etch rate and FWHM was achieved during the long time measurement using the present invention.

Figure 8:
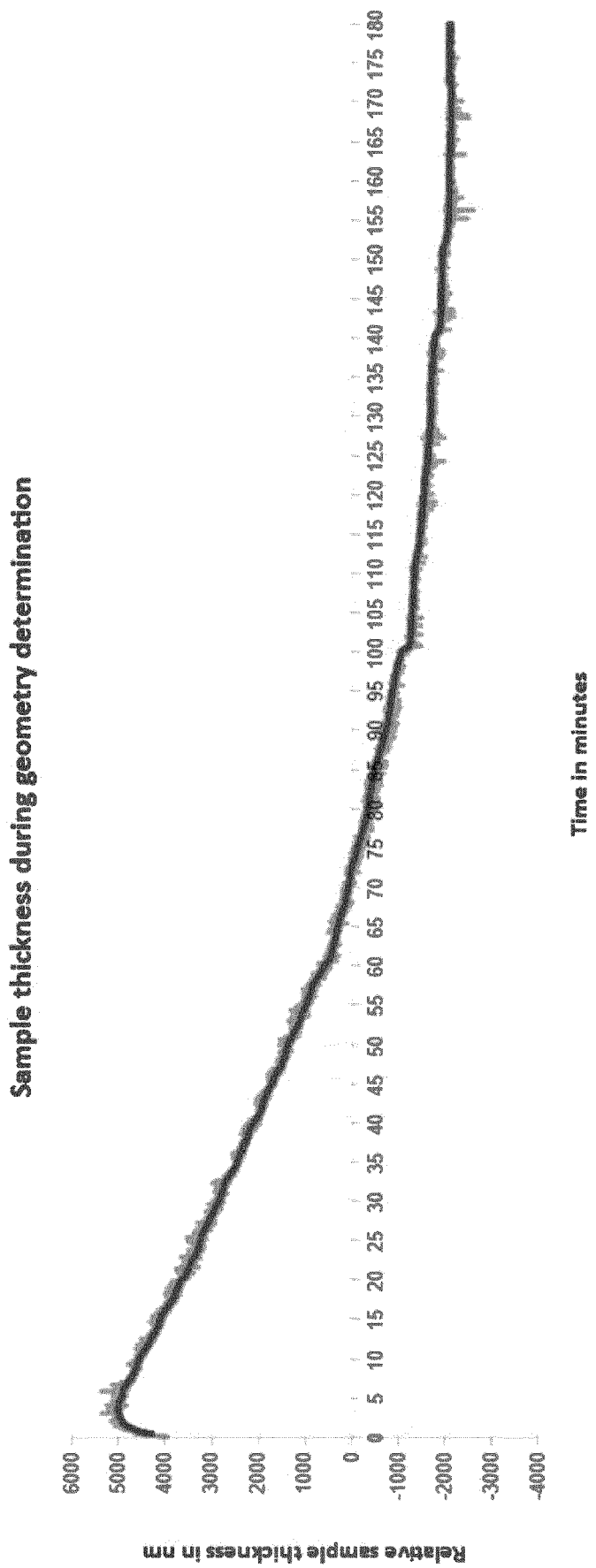
FIG. 8 is a graph showing the sample thickness during the geometry determination.

FIG. 8 is a graph showing the sample thickness during the geometry determination. Again, after an initial heat up of the sample, where the sample thickness increases, the relative sample thickness decreases over time.

Figure 9:
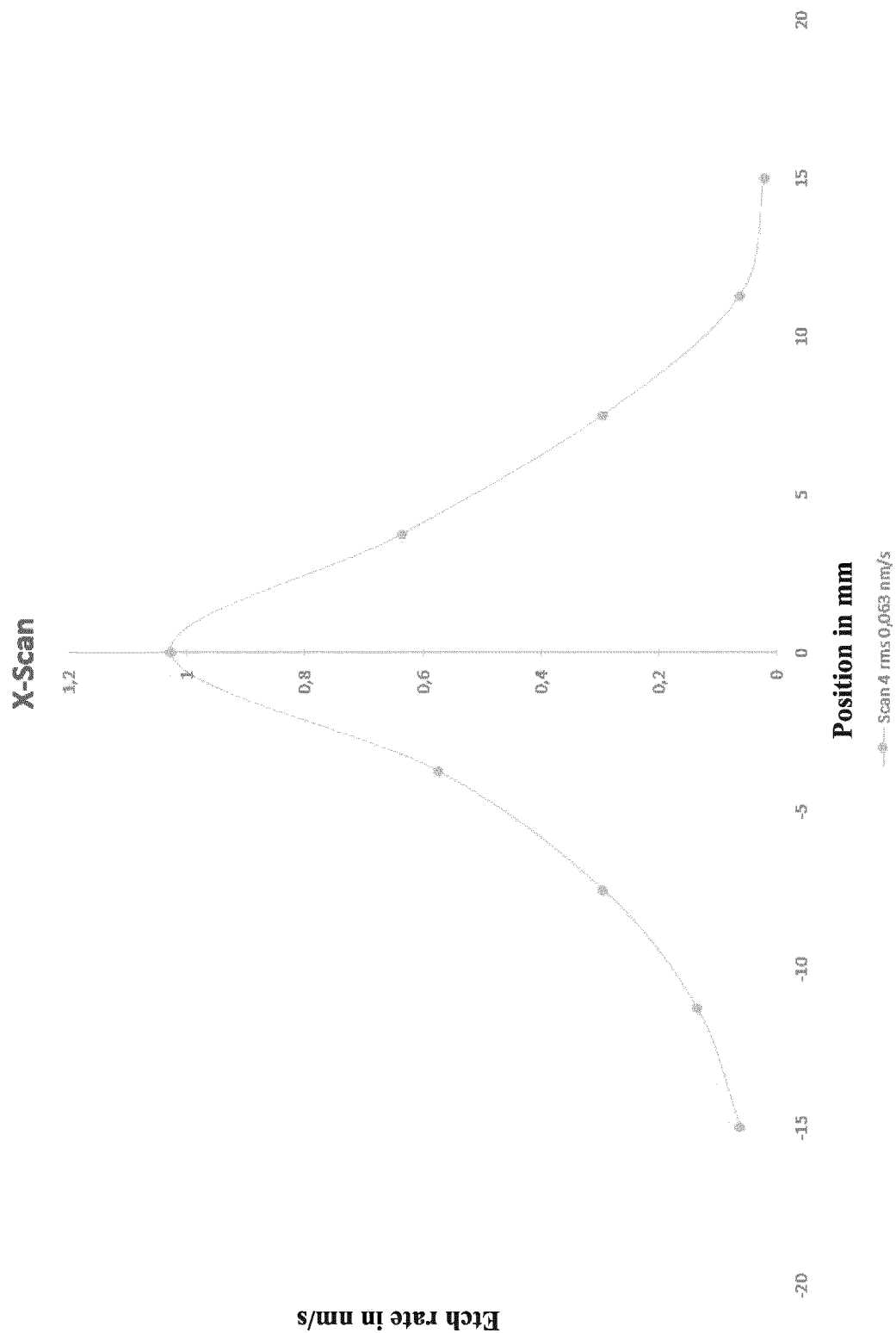
FIG. 9 illustrates the sample thickness during geometry determination.

FIG. 9 illustrates etch rate measurements of different locations on the sample's surface and respective Gaussian fitting to obtain the etch rates of the ion beam profile, i.e. the volume etch rate. In FIG. 9, the y-axis shows the normalized etch rate values and the x-axis shows the displacement of the respective scan from the center.

A Gaussian fit is used to obtain the volume etch rate, which corresponds to the Gaussian profile of the ion beam. As can be seen, the present invention can be used to determine the volume etc rates in-situ.

The point scan functionality of the present invention permits centering of the light directed to the sample's surface with respect to the ion beam by calculating the offset from the configured position. In addition, the ion beam etch rate geometry can be visualized, similar to the electric geometry visualization with Faraday scan. By using 3D Gaussian fit, volume etch rate can be calculated. The point scan is subject to the same restrictions as the peak etch rate measurement and thus exposure time for each point has to be chosen in a process requirement matching deviation grade.

As apparent from the above description, in-situ measurements can be used to determine the etch rate in-situ in a short time with process matching accuracy. No cost-intensive reference probe is necessary and the locking procedure dispenses. The sample can be reused many times before it has to be replaced and the sample material can be exchanged easily.

Figure 10:
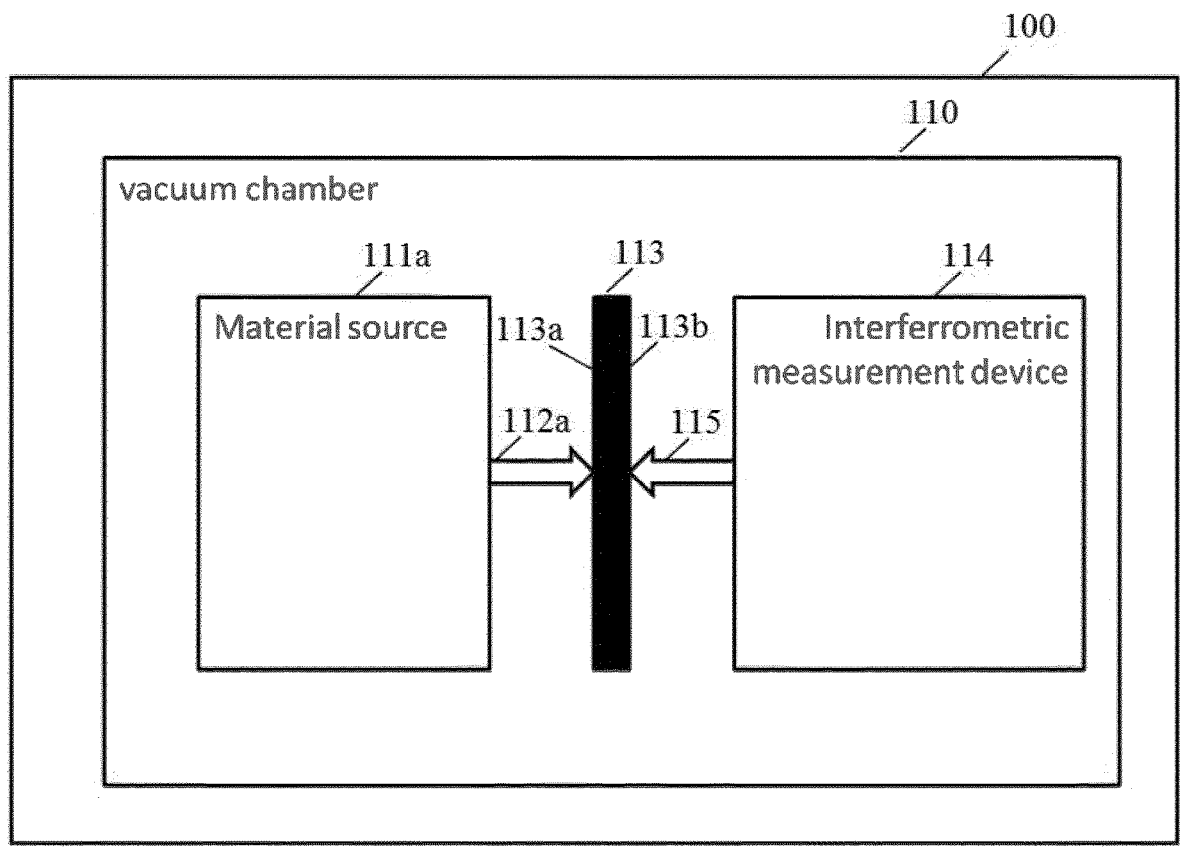
FIG. 10 illustrates another preferred embodiment of the system of the present invention.

With reference to FIG. 10 another preferred embodiment of the system of the present invention is described. FIG. 10 shows a system 100 for in-situ deposition rate measurement. The system comprises a vacuum chamber 110, a material source 111a and an interferometric measurement device 114.

The material source 111a is configured to direct material 112a onto a first surface 113a of a sample 113 located within the vacuum chamber 110 and to deposit the material 112a onto the first surface 113a of the sample 113 with a certain deposition rate.

The interferometric measurement device 114 is located at least partially within the vacuum chamber 110 and configured to direct light 115 onto a second surface 113b of the sample 113 and to determine the deposition rate of the deposited material 112a in-situ based on light reflected from the sample 113.

The interferometric measurement device 114 may be the same one as described with reference to the etch rate determination. Thus, a further description at this point is omitted to avoid unnecessary repetitions.

As the present invention may be embodied in several forms without departing from the scope or essential characteristics thereof, it should be understood that the above-described embodiments are not limited by any of the details of the foregoing descriptions, unless otherwise specified, but rather should be construed broadly within the scope as defined in the appended claims, and therefore all changes and modifications that fall within the present invention are therefore intended to be embraced by the appended claims.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

The invention claimed is:

1. System for in-situ ion beam etch rate or a deposition rate measurement, comprising:
   a vacuum chamber;
   an ion beam source configured to direct an ion beam onto a first surface of a sample located within the vacuum chamber and to etch the first surface of the sample with an etch rate; or
   a material source (111a) configured to deposit material onto a first surface of a sample located within the vacuum chamber with a deposition rate; and
   an interferometric measurement device located at least partially within the vacuum chamber and configured to direct light onto a second surface of the sample and to determine the etch rate of the ion beam or the deposition rate of the deposited material in-situ based on light reflected from the sample.

2. The system of claim 1, wherein the interferometric measurement device is configured to determine the etch rate while etching the first surface of the sample or to determine the deposition rate while depositing the material onto the first surface of the sample.

3. The system of claim 1, wherein the etch rate is the amount of material removed from the sample's first surface over time and the deposition rate is the amount of material deposited onto the sample's first surface over time.

4. The system of claim 1, wherein the interferometric measurement device is a high precision optical low-coherence interferometer, HP-OLCI.

5. The system of claim 1, wherein the second surface of the sample is opposite the first surface of the sample.

6. The system of claim 1, wherein the interferometric measurement device is configured to determine the thickness of the sample over time and to determine the etch rate or the deposition rate based on the thickness variation of the sample over time.

7. The system of claim 1, wherein the interferometric measurement device comprises a sensor configured to direct the light onto the second surface of the sample and to collect light reflected back from the sample.

8. The system of claim 7, wherein the sensor comprises optical components to direct the light onto the second surface of the sample and to collect light reflected back from the sample and preferably wherein the sensor is located within the vacuum chamber and preferably wherein the sensor comprises the sample.

9. The system of claim 8, wherein the sensor comprises a housing and wherein the sample is located inside the housing and preferably wherein the housing comprises an opening and the sample is located at the opening such that the ion beam can reach the sample's first surface through the opening.

10. The system of claim 9, wherein the housing comprises a graphite outer surface.

11. The system of claim 1, wherein the interferometric measurement device comprises a cooling device in contact with the sample and configured to cool the sample.

12. The system of claim 1, wherein the interferometric measurement device comprises a positioning device configured to position the light at at least one predetermined location onto the second surface of the sample and preferably wherein the system further comprises a controller configured to control the positioning device to position the light at the second surface of the sample at a location corresponding to the center of the ion beam to determine a peak etch rate of the ion beam.

13. The system of claim 12, further comprising a controller configured to control the positioning device to position the light at the second surface of the sample at a plurality of locations corresponding to locations within the ion beam profile to determine an etch rate of the ion beam profile.

14. The system of claim 1, further comprising an alignment device configured to align the ion beam with respect to the first surface of the sample, wherein the alignment device preferably comprises a Faraday cup and a position camera or a characterization device configured to characterize the ion beam by a point-scan and calculate the offset to an initial start point.

15. Method for in-situ ion beam etch rate or deposition rate measurement, wherein the method comprises:
    directing an ion beam onto a first surface of a sample located within a vacuum chamber to etch the first surface of the sample with an etch rate; or
    depositing material onto a first surface of a sample located within the vacuum chamber with a deposition rate;
    directing light of an interferometric measurement device located at least partially within the vacuum chamber onto a second surface of the sample; and
    determining the etch rate of the ion beam or the deposition rate of the deposited material in-situ based on light reflected from the sample.

* * * * *